United States Patent
Dean et al.

(10) Patent No.: US 10,521,260 B2
(45) Date of Patent: Dec. 31, 2019

(54) WORKLOAD MANAGEMENT SYSTEM AND PROCESS

(71) Applicant: Hewlett Packard Enterprise Development LP, Houston, TX (US)

(72) Inventors: Steven J. Dean, Chippewa Falls, WI (US); Michael Woodacre, Winchester (GB); Randal S. Passint, Chippewa Falls, WI (US); Eric C. Fromm, Eau Claire, WI (US); Thomas E. McGee, Eau Claire, WI (US); Michael E. Malewicki, Eau Claire, WI (US); Kirill Malkin, Morris Plains, NJ (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 176 days.

(21) Appl. No.: 15/650,357

(22) Filed: Jul. 14, 2017

(65) Prior Publication Data

US 2018/0018196 A1    Jan. 18, 2018

Related U.S. Application Data

(60) Provisional application No. 62/362,911, filed on Jul. 15, 2016, provisional application No. 62/363,014, filed on Jul. 15, 2016.

(51) Int. Cl.
*G06F 9/46* (2006.01)
*G06F 9/455* (2018.01)
(Continued)

(52) U.S. Cl.
CPC .......... *G06F 9/45558* (2013.01); *G06F 9/50* (2013.01); *G06F 9/5077* (2013.01); *G06F 9/54* (2013.01);
(Continued)

(58) Field of Classification Search
None
See application file for complete search history.

(56) References Cited

U.S. PATENT DOCUMENTS 6,148,349 A    11/2000  Chow et al.
7,234,003 B2    6/2007  Zaumen et al.
(Continued)

FOREIGN PATENT DOCUMENTS

WO    2017/171798 A1    10/2017

*Primary Examiner* — Gregory A Kessler
(74) *Attorney, Agent, or Firm* — Hewlett Packard Enterprise Patent Department

(57) ABSTRACT

A high performance computing (HPC) system has an architecture that separates data paths used by compute nodes exchanging computational data from the data paths used by compute nodes to obtain computational work units and save completed computations. The system enables an improved method of saving checkpoint data, and an improved method of using an analysis of the saved data to assign particular computational work units to particular compute nodes. The system includes a compute fabric and compute nodes that cooperatively perform a computation by mutual communication using the compute fabric. The system also includes a local data fabric that is coupled to the compute nodes, a memory, and a data node. The data node is configured to retrieve data for the computation from an external bulk data storage, and to store its work units in the memory for access by the compute nodes.

9 Claims, 5 Drawing Sheets

(51) Int. Cl.
*G06F 9/50* (2006.01)
*G06Q 10/06* (2012.01)
*G06F 9/54* (2006.01)
*H04L 29/08* (2006.01)

(52) U.S. Cl.
CPC ... *G06Q 10/06* (2013.01); *G06F 2009/45595* (2013.01); *H04L 29/08315* (2013.01); *H04L 67/1042* (2013.01)

(56) References Cited

U.S. PATENT DOCUMENTS

| | | |
|---|---|---|
| 7,647,590 B2 | 1/2010 | Archer et al. |
| 8,229,945 B2 | 7/2012 | Dinker et al. |
| 8,396,937 B1 | 3/2013 | O'Krafka et al. |
| 8,407,424 B2 | 3/2013 | Dai et al. |
| 9,734,063 B2 | 8/2017 | Novakovic et al. |
| 2007/0067435 A1 | 3/2007 | Landis et al. |
| 2014/0149715 A1* | 5/2014 | Inman ............... G06F 15/17393 712/29 |
| 2016/0026590 A1 | 1/2016 | Park et al. |

* cited by examiner

WORKLOAD MANAGEMENT SYSTEM AND PROCESS

CROSS-REFERENCE TO RELATED APPLICATION

This application claims the benefit of U.S. Provisional Application No. 62/362,911, filed Jul. 15, 2016, and Provisional Application No. 62/363,014, also filed Jul. 15, 2016, the respective contents of which are incorporated herein by reference in their entireties.

BACKGROUND OF THE DISCLOSURE

High performance computing ("HPC") or "supercomputer" systems are used to perform computations that require large quantities of computing resources. HPC systems may be used, for example, in weather forecasting and aerodynamic modeling, cryptography and code breaking, simulation of nuclear weapons testing or molecular dynamics, and 'big data' analytics. These applications may require large amounts of memory or data storage, and large numbers of (or extremely fast) memory accesses or computational operations. Often, these large amounts of memory or data storage are provided by network many computers together. Some clustered HPC systems provide federated memory using non-uniform memory access ("NUMA"), which allows each node to access the memory of some or all of the other nodes.

There are two main paradigms used to design HPC systems: scale-out and scale-up, which roughly correspond to the ideas of 'bigger' and 'better'. Scale-out systems are 'bigger', in the sense that they network many commodity computing devices (such as retail server computers) in a cluster. By contrast, scale-up systems are 'better', in the sense that they embody better, often cutting-edge technology: faster processors, faster memory, larger memory capability, and so on.

SUMMARY OF THE DISCLOSURE

Illustrative implementations of the disclosure provide an architecture for HPC systems that incorporates the relative advantages of both scale-up and scale-out, by separating the data paths used by nodes exchanging computational data from the data paths used by nodes to obtain work units and save completed computations. This separation may provide many advantages, discussed below in more detail, including improving data input/output ("I/O") performance, improving HPC system resilience, improving energy efficiency, and improving the flow of computational work units through the HPC system. The illustrated concepts and advantages are not restricted to use only in HPC systems, but apply in smaller scale systems as well.

Thus, a first implementation of the disclosure is a system for performing a computation that has instructions and data, the data being divisible into computational work units. The system includes a compute fabric, and a plurality of compute nodes to cooperatively perform the computation by mutual communication between the compute nodes, according to the instructions, using the compute fabric. The system also includes a local data fabric simultaneously coupled to each compute node, and, coupled to the local data fabric, a memory for storing computational work units, each of the plurality of compute nodes to obtain computational work units using the local data fabric. The system also contains, coupled to the local data fabric, a data node to retrieve the data from an external bulk data storage, and to store the computational work units in the memory. Thus, computational work units do not travel across the compute fabric.

One refinement of the basic system further includes a second plurality of compute nodes to cooperatively perform a second computation that has instructions and data by mutual communication between the compute nodes of the second plurality, according to the instructions of the second computation, using the compute fabric. The data of the second computation may also be divisible into computational work units.

The system also may have a second local data fabric simultaneously coupled to each compute node in the second plurality; coupled to the second local data fabric, a second memory for storing computational work units of the second computation, each of the second plurality of compute nodes to obtain computational work units using the second local data fabric; and coupled to the second local data fabric and the first data node, a second data node to retrieve the data of the second computation from the external bulk data storage, and to store computational work units of the second computation in the second memory.

In either case, the second plurality of compute nodes may save a state of the first computation. It may further analyze the saved stated, and on the basis of the analysis, either assign a compute node in the first plurality of compute nodes to process a particular computational work unit of the first computation; or reassign one or more of the compute nodes in the first plurality of compute nodes to perform a third computation.

A second implementation of the disclosure is a method of performing a computation that has instructions and data, the data being divisible into computational work units. The method first includes configuring a plurality of compute nodes to cooperatively perform the computation by mutual communication between the compute nodes, according to the instructions, using a compute fabric. Next, the method includes configuring each of the plurality of compute nodes to obtain computational work units using a local data fabric simultaneously coupled to each compute node. Finally, the method calls for configuring a data node, coupled to the local data fabric, to retrieve the data from an external bulk data storage, and to store the computational work units in a memory coupled to the local data fabric.

In one refinement, the method also includes configuring a second plurality of compute nodes to cooperatively perform a second computation that has instructions and data by mutual communication between the compute nodes of the second plurality, according to the instructions of the second computation, using the compute fabric. The method also may include configuring each of the second plurality of compute nodes to obtain computational work units of the second computation using a second local data fabric simultaneously coupled to each compute node in the second plurality; and configuring a second data node, coupled to the second local data fabric and the first data node, to retrieve the data of the second computation from the external bulk data storage, and to store the computational work units of the second computation in a second memory coupled to the second local data fabric.

In either case, the second plurality of compute nodes may save a state of the first computation. It may further analyze the saved state, and on the basis of the analysis, either assign a compute node, that is cooperatively performing the first computation, to process a particular computational work unit of the first computation; or reassign one or more of the compute nodes, that are cooperatively performing the first computation, to perform a third computation.

A third implementation of the disclosure is a tangible computer-readable medium in which is non-transitorily fixed a series of computer instructions that, when executed by a plurality of compute nodes, produces a method of performing a computation that has data, the data being divisible into computational work units. The method produced is described above. Refinements of the third implementation may include additional instructions to refine the produced method, in the manner described above.

BRIEF DESCRIPTION OF THE DRAWINGS

Those skilled in the art should more fully appreciate advantages of various implementations of the disclosure from the following "Description of Illustrative Implementations," discussed with reference to the drawings summarized immediately below.

DETAILED DESCRIPTION OF ILLUSTRATIVE IMPLEMENTATIONS

System Architecture

Figure 1:
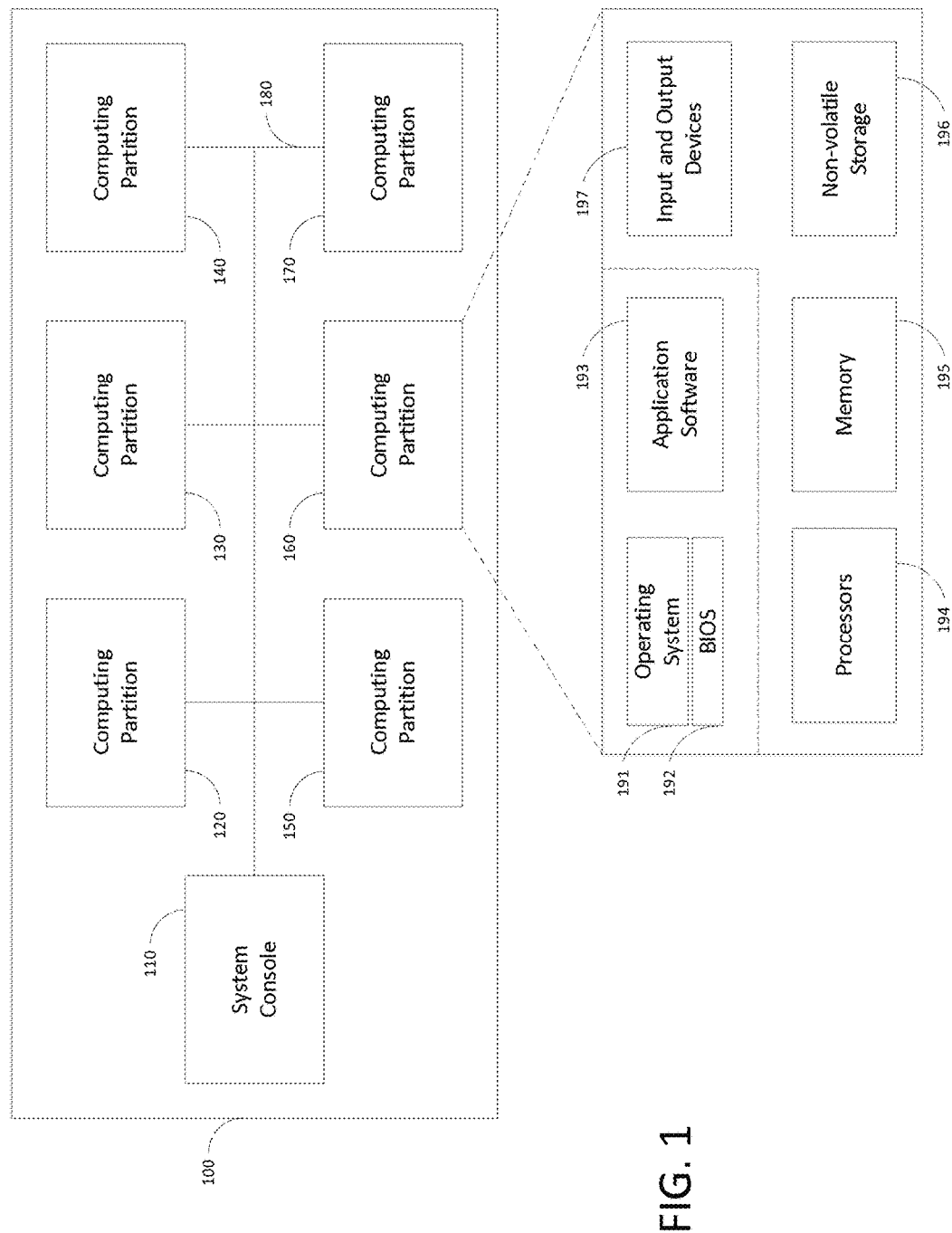
FIG. 1 schematically shows a logical view of an HPC system in accordance with one implementation of the present disclosure.

FIG. 1 schematically shows a logical view of an exemplary high-performance computer system 100 that may be used with illustrative implementations of the present disclosure. The HPC system 100 includes a number of logical computer partitions 120, 130, 140, 150, 160, 170 for providing computational resources, and a system console 110 for managing the plurality of partitions 120-170. Partitions 120-170 may communicate with the system console 110 using a logical communication network 180. A system user, such as a scientist or engineer who desires to perform a calculation, may request computational resources from a system operator, who uses the system console 110 to allocate and manage those resources. Allocation of computational resources to partitions is described below. The HPC system 100 may have any number of computer partitions that are administratively assigned as described in more detail below, and often has only one partition that encompasses all of the available computer resources. Accordingly, this figure should not be seen as limiting the scope of the disclosure.

Each computer partition, such as partition 160, may be viewed logically as if it were a single computer, akin to a desktop computer. Thus, the partition 160 may execute software, including a single operating system ("OS") instance 191 that uses a basic input/output system ("BIOS") 192 as these are used together in the art, and application software 193 for one or more system users.

Accordingly, as also shown in FIG. 1, a computer partition has various hardware allocated to it by a system operator, including one or more processors 194, volatile memory 195, non-volatile storage 196, and input and output ("I/O") devices 197 (e.g., network ports, video display devices, keyboards, and the like). However, in HPC systems like the implementation in FIG. 1, each computer partition has a great deal more processing power and memory than a typical desktop computer. The OS software may include, for example, a Windows® operating system by Microsoft Corporation of Redmond, Wash., or a Linux operating system. Moreover, although the BIOS may be provided as firmware by a hardware manufacturer, such as Intel Corporation of Santa Clara, Calif., it is typically customized according to the needs of the HPC system designer to support high-performance computing, as described below in more detail.

As part of its system management role, the system console 110 acts as an interface between the computing capabilities of the computer partitions 120-170 and the system operator or other computer partition systems. To that end, the system console 110 issues commands to the HPC system hardware and software on behalf of the system operator that permit, among other things: 1) booting the hardware, 2) dividing the system computer resources into computer partitions, 3) initializing the partitions, 4) monitoring the health of each partition and any hardware or software errors generated therein, 5) distributing operating systems and application software to the various partitions, 6) causing the operating systems and software to execute, 7) backing up the state of the partition or software therein, 8) shutting down application software, and 9) shutting down a computer partition or the entire HPC system 100. These particular functions are described in more detail in the section below entitled "System Operation."

Figure 2:
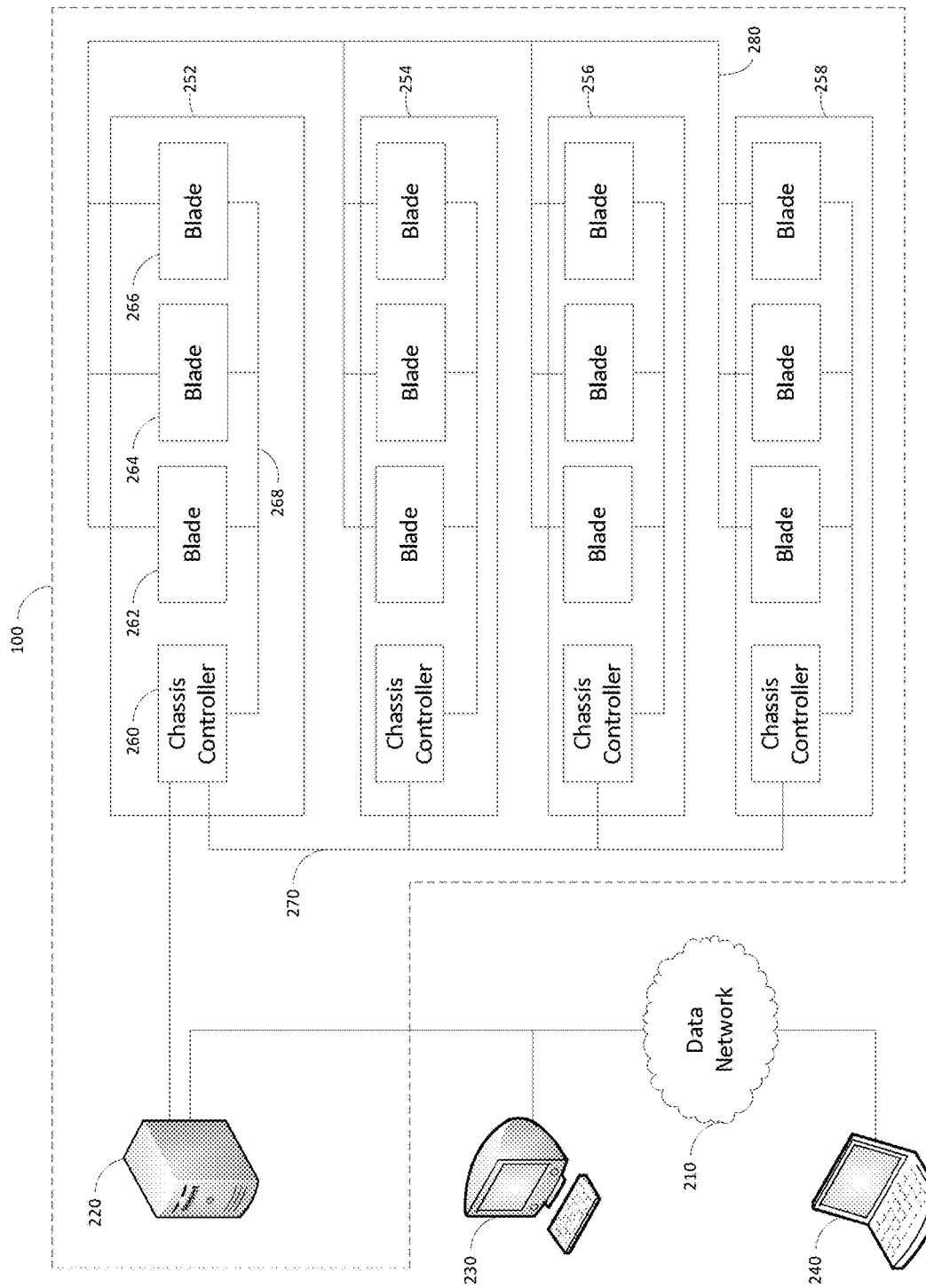
FIG. 2 schematically shows a physical view of the HPC system of FIG. 1.

FIG. 2 schematically shows a physical view of a high performance computer system 100 in accordance with the implementation of FIG. 1. The hardware that comprises the HPC system 100 of FIG. 1 is surrounded by the dashed line. The HPC system 100 is connected to a customer data network 210 to facilitate customer access.

The HPC system 100 includes a system management node ("SMN") 220 that performs the functions of the system console 110. The management node 220 may be implemented as a desktop computer, a server computer, or other similar computer, provided either by the customer or the HPC system designer, and includes software necessary to control the HPC system 100 (i.e., the system console software).

The HPC system 100 is accessible using the data network 210, which may include any data network known in the art, such as a customer local area network ("LAN"), a virtual private network ("VPN"), the Internet, or the like, or a combination of these networks. Any of these networks may permit a number of users to access the HPC system resources remotely and/or simultaneously. For example, the management node 220 may be accessed by a customer computer 230 by way of remote login using tools known in the art such as Windows® Remote Desktop Services or the UNIX secure shell. If the customer is so inclined, access to the HPC system 100 may be provided to a remote computer 240. The remote computer 240 may access the HPC system by way of a login to the management node 220 as just described, or using a gateway or proxy system as is known to persons in the art.

The hardware computer resources of the HPC system 100 (e.g., the processors, memory, non-volatile storage, and I/O devices shown in FIG. 1) are provided collectively by one or more "blade chassis," such as blade chassis 252, 254, 256, 258 shown in FIG. 2, that are managed and allocated into computer partitions. A blade chassis is an electronic chassis that is configured to house, power, and provide high-speed data communications between a plurality of stackable, modular electronic circuit boards called "blades." Each blade includes enough computer hardware to act as a standalone computer server. The modular design of a blade chassis permits the blades to be connected to power and data lines with a minimum of cabling and vertical space.

Accordingly, each blade chassis, for example blade chassis 252, has a chassis management controller 260 (also referred to as a "chassis controller" or "CMC") for managing system functions in the blade chassis 252, and a number of blades 262, 264, 266 for providing computer resources. Each blade, for example blade 262, contributes its hardware computer resources to the collective total resources of the HPC system 100. The system management node 220 manages the hardware computer resources of the entire HPC system 100 using the chassis controllers, such as chassis controller 260, while each chassis controller in turn manages the resources for just the blades in its blade chassis. The chassis controller 260 is physically and electrically coupled to the blades 262-266 inside the blade chassis 252 by means of a local management bus 268, described below in more detail. The hardware in the other blade chassis 254-258 is similarly configured.

The chassis controllers communicate with each other using a management connection 270. The management connection 270 may be a high-speed LAN, for example, running an Ethernet communication protocol, or other data bus. By contrast, the blades communicate with each other using a computing connection 280. To that end, the computing connection 280 illustratively has a high-bandwidth, low-latency system interconnect, such as NumaLink, developed by Silicon Graphics International Corp. of Milpitas, Calif.

The chassis controller 260 provides system hardware management functions to the rest of the HPC system. For example, the chassis controller 260 may receive a system boot command from the SMN 220, and respond by issuing boot commands to each of the blades 262-266 using the local management bus 268. Similarly, the chassis controller 260 may receive hardware error data from one or more of the blades 262-266 and store this information for later analysis in combination with error data stored by the other chassis controllers. In some implementations, such as that shown in FIG. 2, the SMN 220 or a customer computer 230 are provided access to a single, master chassis controller 260 that processes system management commands to control the HPC system 100 and forwards these commands to the other chassis controllers. In other implementations, however, an SMN 220 is coupled directly to the management connection 270 and issues commands to each chassis controller individually. Persons having ordinary skill in the art may contemplate variations of these designs that permit the same type of functionality, but for clarity only these designs are presented.

The blade chassis 252, its blades 262-266, and the local management bus 268 may be provided as known in the art. However, the chassis controller 260 may be implemented using hardware, firmware, or software provided by the HPC system designer. Each blade provides the HPC system 100 with some quantity of processors, volatile memory, non-volatile storage, and I/O devices that are known in the art of standalone computer servers. However, each blade also has hardware, firmware, and/or software to allow these computer resources to be grouped together and treated collectively as computer partitions, as described below in more detail in the section entitled "System Operation."

While FIG. 2 shows an HPC system 100 having four chassis and three blades in each chassis, it should be appreciated that these figures do not limit the scope of the disclosure. An HPC system may have dozens of chassis and hundreds of blades; indeed, HPC systems often are desired because they provide very large quantities of tightly-coupled computer resources.

Figure 3:
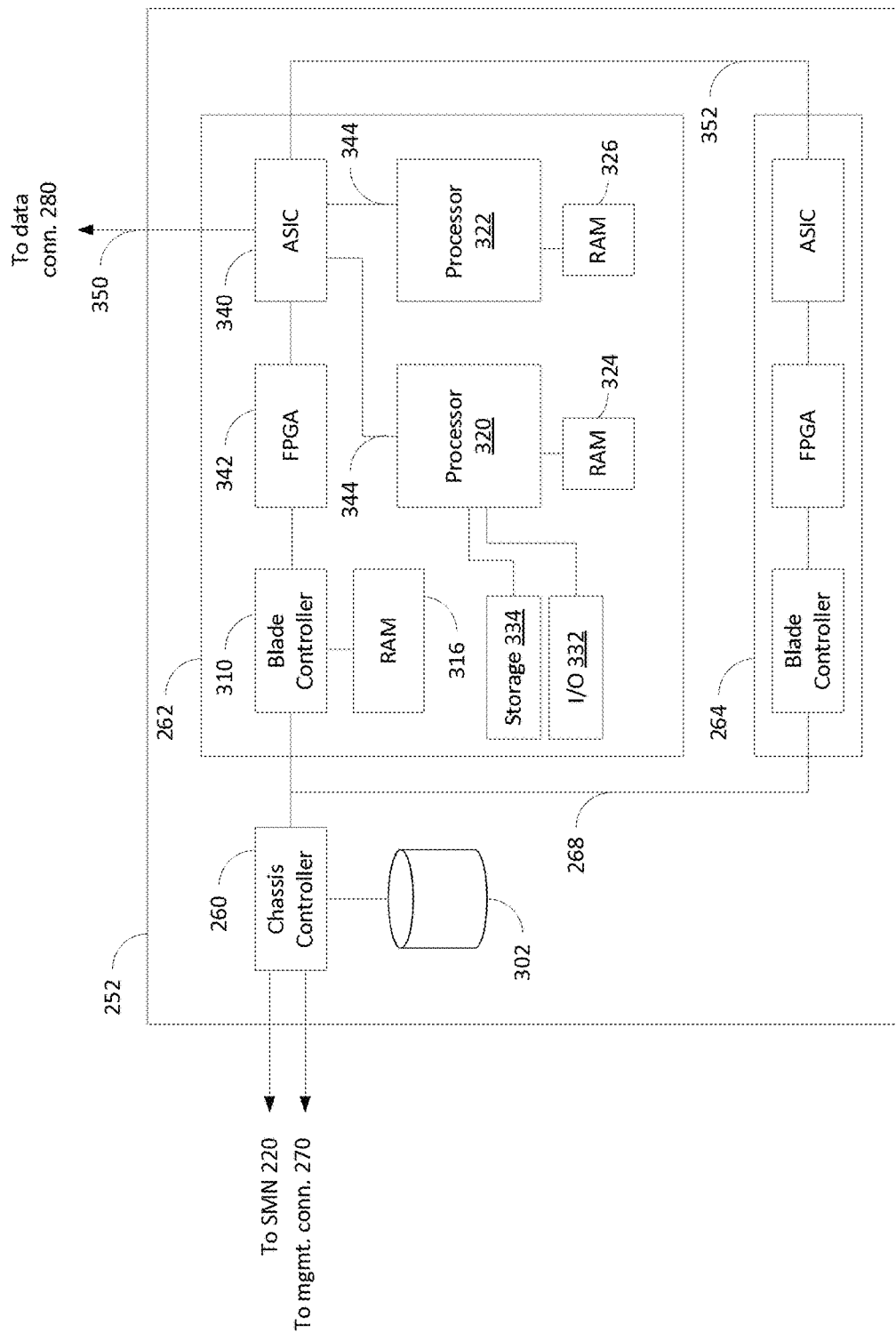
FIG. 3 schematically shows details of a blade chassis of the HPC system of FIG. 1.

FIG. 3 schematically shows a single blade chassis 252 in more detail. In this figure, parts not relevant to the immediate description have been omitted. The chassis controller 260 is shown with its connections to the system management node 220 and to the management connection 270. The chassis controller 260 may be provided with a chassis data store 302 for storing chassis management data. In some implementations, the chassis data store 302 is volatile random access memory ("RAM"), in which case data in the chassis data store 302 are accessible by the SMN 220 so long as power is applied to the blade chassis 252, even if one or more of the computer partitions has failed (e.g., due to an OS crash) or a blade has malfunctioned. In other implementations, the chassis data store 302 is non-volatile storage such as a hard disk drive ("HDD") or a solid state drive ("SSD"). In these implementations, data in the chassis data store 302 are accessible after the HPC system has been powered down and rebooted.

FIG. 3 shows relevant portions of specific implementations of the blades 262 and 264 for discussion purposes. The blade 262 includes a blade management controller 310 (also called a "blade controller" or "BMC") that executes system management functions at a blade level, in a manner analogous to the functions performed by the chassis controller at the chassis level. For more detail on the operations of the chassis controller and blade controller, see the section entitled "HPC System Operation" below. The blade controller 310 may be implemented as custom hardware, designed by the HPC system designer to permit communication with the chassis controller 260. In addition, the blade controller 310 may have its own RAM 316 to carry out its management functions. The chassis controller 260 communicates with the blade controller of each blade using the local management bus 268, as shown in FIG. 3 and the previous figures.

The blade 262 also includes one or more microprocessors 320, 322 (alternatively referred to as "processors 320 or 322" or generically referred to as "processors 320") that are connected to RAM 324, 326. Blade 262 may be alternately configured so that multiple processors may access a common set of RAM on a single bus, as is known in the art. It should also be appreciated that processors 320, 322 may include any number of central processing units ("CPUs") or cores, as is known in the art. The processors 320, 322 in the blade 262 are connected to other items, such as a data bus that communicates with I/O devices 332, a data bus that communicates with non-volatile storage 334, and other buses commonly found in standalone computer systems. (For clarity, FIG. 3 shows only the connections from processor 320 to these other devices.) The processors 320, 322 may be, for example, Intel® Core™ processors manufactured by Intel Corporation. The I/O bus may be, for example, a PCI or PCI Express ("PCIe") bus. The storage bus may be, for example, a SATA, SCSI, or Fibre Channel bus. It will be appreciated that other bus standards, processor types, and processor manufacturers may be used in accordance with illustrative implementations of the present disclosure.

Each blade (e.g., the blades 262 and 264) includes an application-specific integrated circuit 340 (also referred to as an "ASIC", "hub chip", or "hub ASIC") that controls much of its functionality. More specifically, to logically connect the processors 320, 322, RAM 324, 326, and other devices 332, 334 together to form a managed, multi-processor, (optionally) coherently-shared distributed-memory HPC system, the processors 320, 322 are electrically connected to the hub ASIC 340. The hub ASIC 340 thus provides an interface between the HPC system management functions generated by the SMN 220, chassis controller 260, and blade controller 310, and the computer resources of the blade 262.

In this connection, the hub ASIC 340 connects with the blade controller 310 either through a direct connection, or by way of a field-programmable gate array ("FPGA") 342 or similar programmable device for passing signals between integrated circuits. Those skilled in the art can select the appropriate connection between the hub ASIC 340 and the blade controller 310. Discussion of the direct connection or indirect connection should not limit various implementations of the disclosure.

In particular, signals are generated on output pins of the blade controller 310, in response to commands issued by the chassis controller 260. In the indirect connection case, these signals are translated by the FPGA 342 into commands for certain input pins of the hub ASIC 340, and vice versa. For example, a "power on" signal received by the blade controller 310 from the chassis controller 260 requires, among other things, providing a "power on" voltage to a certain pin on the hub ASIC 340; the FPGA 342 facilitates this task.

The field-programmable nature of the FPGA 342 permits the interface between the blade controller 310 and ASIC 340 to be reprogrammable after manufacturing. Thus, for example, the blade controller 310 and ASIC 340 may be designed to have certain generic functions, and the FPGA 342 may be used advantageously to program the use of those functions in an application-specific way. The communications interface between the blade controller 310 and ASIC 340 also may be updated if a hardware design error is discovered in either module, permitting a quick system repair without requiring new hardware to be fabricated.

Also in connection with its role as the interface between computer resources and system management, the hub ASIC 340 is connected to the processors 320, 322 by way of a high-speed processor interconnect 344. In one implementation, the processors 320, 322 are manufactured by Intel Corporation which provides the Intel® QuickPath Interconnect ("QPI") for this purpose, and the hub ASIC 340 includes a module for communicating with the processors 320, 322 using QPI. Other implementations may use other processor interconnect configurations.

The hub chip 340 in each blade also provides connections to other blades for high-bandwidth, low-latency data communications. Thus, the hub chip 340 includes a link 350 to the computing connection 280 that connects different blade chassis. This link 350 may be implemented using networking cables, for example. The hub ASIC 340 also includes connections to other blades in the same blade chassis 252. The hub ASIC 340 of blade 262 connects to the hub ASIC 340 of blade 264 by way of a chassis computing connection 352. The chassis computing connection 352 may be implemented as a data bus on a backplane of the blade chassis 252 rather than using networking cables, advantageously allowing the very high speed data communication between blades that is required for high-performance computer tasks. Data communication on both the inter-chassis computing connection 280 and the intra-chassis computing connection 352 may be implemented using the NumaLink protocol or a similar protocol.

HPC System Operation

System management commands generally propagate from the SMN 220, through the management connection 270 to the blade chassis (and their chassis controllers), then to the blades (and their blade controllers), and finally to the hub ASICS that implement the commands using the system computer hardware.

As a concrete example, consider the process of powering on an HPC system. In accordance with exemplary implementations, the HPC system 100 is powered when a system operator issues a "power on" command from the SMN 220. The SMN 220 propagates this command to each of the blade chassis 252-258 by way of their respective chassis controllers, such as chassis controller 260 in blade chassis 252. Each chassis controller, in turn, issues a "power on" command to each of the respective blades in its blade chassis by way of their respective blade controllers, such as blade controller 310 of blade 262. Blade controller 310 issues a "power on" command to its corresponding hub chip 340 using the FPGA 342, which provides a signal on one of the pins of the hub chip 340 that allows it to initialize. Other commands propagate similarly.

Once the HPC system is powered on, its computer resources may be divided into computer partitions. The quantity of computer resources that are allocated to each computer partition is an administrative decision. For example, a customer may have a number of projects to complete, and each project is projected to require a certain amount of computer resources. Different projects may require different proportions of processing power, memory, and I/O device usage, and different blades may have different quantities of the resources installed. The HPC system administrator takes these considerations into account when partitioning the computer resources of the HPC system 100. Partitioning the computer resources may be accomplished by programming each blade's RAM 316. For example, the SMN 220 may issue appropriate blade programming commands after reading a system configuration file.

The collective hardware computer resources of the HPC system 100 may be divided into computer partitions according to any administrative need. Thus, for example, a single computer partition may include the computer resources of some or all of the blades of one blade chassis 252, all of the blades of multiple blade chassis 252 and 254, some of the blades of one blade chassis 252 and all of the blades of blade chassis 254, all of the computer resources of the entire HPC system 100, and other similar combinations. Hardware computer resources may be partitioned statically, in which case a reboot of the entire HPC system 100 is required to reallocate hardware. Alternatively and preferentially, hardware computer resources are partitioned dynamically while the HPC system 100 is powered on. In this way, unallocated resources may be assigned to a partition without interrupting the operation of other partitions.

It should be noted that once the HPC system 100 has been appropriately partitioned, each partition may be considered to act as a standalone computer system. Thus, two or more partitions may be combined to form a logical computing group inside the HPC system 100. Such grouping may be necessary if, for example, a particular computational task is allocated more processors or memory than a single operating system can control. For example, if a single operating system can control only 64 processors, but a particular computational task requires the combined power of 256 processors, then four partitions may be allocated to the task in such a group. This grouping may be accomplished using techniques known in the art, such as installing the same software on each computer partition and providing the partitions with a VPN.

Once at least one partition has been created, the partition may be booted and its computer resources initialized. Each computer partition, such as partition 160, may be viewed logically as having a single OS 191 and a single BIOS 192. As is known in the art, BIOS is a collection of instructions that electrically probes and initializes the available hardware to a known state so that the OS can boot, and is typically provided in a firmware chip on each physical server. However, a single logical computer partition 160 may span several blades, or even several blade chassis. A blade may be referred to as a "compute node" or simply a "node" to emphasize its allocation to a particular partition.

Booting a partition in accordance with an implementation of the disclosure requires a number of modifications to be made to a blade chassis that is purchased from stock. In particular, the BIOS in each blade are modified to determine other hardware resources in the same computer partition, not just those in the same blade or blade chassis. After a boot command has been issued by the SMN 220, the hub ASIC 340 eventually provides an appropriate signal to the processor 320 to begin the boot process using BIOS instructions. The BIOS instructions, in turn, obtain partition information from the hub ASIC 340 such as: an identification (node) number in the partition, a node interconnection topology, a list of devices that are present in other nodes in the partition, a master clock signal used by all nodes in the partition, and so on. Armed with this information, the processor 320 may take whatever steps are required to initialize the blade 262, including 1) non-HPC-specific steps such as initializing I/O devices 332 and non-volatile storage 334, and 2) also HPC-specific steps such as synchronizing a local hardware clock to a master clock signal, initializing HPC-specialized hardware in a given node, managing a memory directory that includes information about which other nodes in the partition have accessed its RAM, and preparing a partition-wide physical memory map.

At this point, each physical BIOS has its own view of the partition, and all of the computer resources in each node are prepared for the OS to load. The BIOS then reads the OS image and executes it, in accordance with techniques known in the art of multiprocessor systems. The BIOS presents to the OS a view of the partition hardware as if it were all present in a single, very large computer, even if the hardware itself is scattered among multiple blade chassis and blades. In this way, a single OS instance spreads itself across some, or preferably all, of the blade chassis and blades that are assigned to its partition. Different operating systems may be installed on the various partitions. If an OS image is not present, for example immediately after a partition is created, the OS image may be installed using processes known in the art before the partition boots.

Once the OS is safely executing, its partition may be operated as a single logical computer. Software for carrying out desired computations may be installed to the various partitions by the HPC system operator. Users may then log into the SMN 220. Access to their respective partitions from the SMN 220 may be controlled using volume mounting and directory permissions based on login credentials, for example. The system operator may monitor the health of each partition, and take remedial steps when a hardware or software error is detected. The current state of long-running application programs may be saved to non-volatile storage, either periodically or on the command of the system operator or application user, to guard against losing work in the event of a system or application crash. The system operator or a system user may issue a command to shut down application software. Other operations of an HPC partition may be known to a person having ordinary skill in the art. When administratively required, the system operator may shut down a computer partition entirely, reallocate or deallocate computer resources in a partition, or power down the entire HPC system 100.

Improved Architecture for HPC Systems

To achieve performance beyond what is available with existing HPC systems, illustrated implementations of the disclosure provide a highly parallel, "next generation" architecture for HPC systems. Critical performance gains have been realized by separating the data paths for functional parallelism (i.e., exchanging small amounts of data between nodes, mid-computation) from those for data parallelism (i.e., loading large work units by individual nodes pre-computation, and saving the results post-computation).

In particular, this separation permits highly optimized routing of workloads throughout the HPC system. By decoupling compute and data fabric use, not only are compute performance and repeatability improved, but new workflow capabilities are enabled by tightly coupling workload management to other aspects of system operation. An example is the ability to analyze application checkpoint data in parallel with running the applications themselves, enabling the ability to steer computational workloads to ensure productive use of the compute resources at all times.

Figure 4:
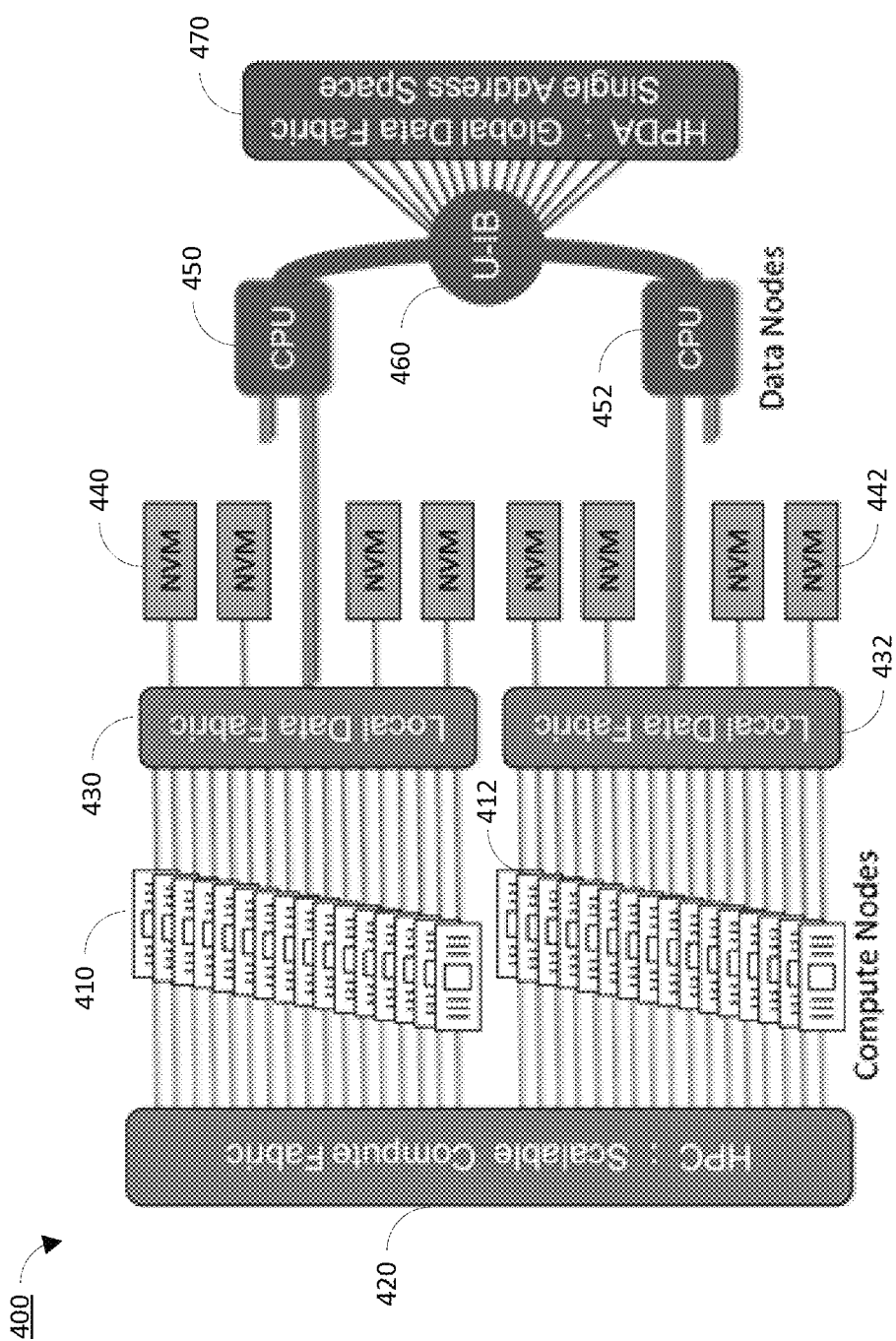
FIG. 4 schematically shows a logical view of an HPC system in accordance with another implementation of the present disclosure.

FIG. 4 is a schematic representation of an improved logical design for an HPC system 400 in accordance with an implementation of the disclosure, showing separate data paths as described herein. The HPC system 400 includes at least two different types of nodes, compute nodes and data nodes, which may be implemented as blades allocated to a particular partition, as described above.

Compute nodes in groups 410, 412 perform functional parallelism: they cooperate to perform a computation with respect to input data. Cooperation is achieved by the exchange, between the compute nodes in each group 410 or 412, of data pertaining to various portions of the computation, using a scalable compute fabric 420. One such scalable compute fabric 420 is described in the aforementioned U.S. Provisional Application No. 62/362,911, and which is referred to herein as "Universal InfiniBand" or "U-IB." It should be appreciated that other implementations of the disclosure may use different compute fabrics or interconnects, provided they also provide the abilities to share memory across compute nodes or otherwise exchange data at a high bandwidth and with a low latency.

To obtain the data required to perform the computation, and to save the results, compute nodes in groups 410, 412 use a respective local data fabric 430, 432, which also may be implemented using U-IB or another fabric. The local data fabrics 430, 432 are used for the movement of bulk data, rather than movement of computational data. Importantly, the local data fabrics 430, 432 are physically distinct from the scalable compute fabric 420, so movement of bulk data (for example, to load a given compute node with data, providing data parallelism) does not tie up the same fabric used to move cache lines for computation, thereby improving system performance.

The HPC system 400 shown in FIG. 4 includes two local data fabrics 430, 432, each of which may be a chassis computing connection 352. Multiple local data fabrics 430, 432 improve data parallelism, as each may be attached to a different group 410, 412 of compute nodes, so the transfer of bulk data to one group of compute nodes does not tie up the same fabric used to transfer other bulk data to another group of compute nodes. Nevertheless, both groups of compute nodes 410, 412 may be allocated to a single, administrative partition 120. Implementations of the disclosure may include any number of local data fabrics. Bulk data may be stored in solid-state, non-volatile memories, of which NVM 440 is one of many, that are accessible by each compute node group 410, 412 using a respective local data fabric 430, 432.

Data nodes, by contrast, are used to manage computational bulk data, including to move it into and out of the local data fabrics 430, 432. Each data node 450, 452 retrieves bulk data from an external bulk data store (not shown) using an I/O device, such as device 332, and stores it in a NVM coupled to its local data fabric, such as NVM 440 or NVM 442. In this way, bulk data advantageously are made accessible to compute nodes in the group 410, without expending any computational resources present in the group 410.

As shown in FIG. 4, the HPC system 400 has multiple data nodes 450, 452, and implementations of the disclosure may include any number of such data nodes. The data nodes 450, 452 themselves are coupled via an interconnect 460, which may be U-IB or some other interconnect, and which may form a link 350 between the chassis 252, 254, 256, 258 of the HPC system. The interconnect 460 also is used to communicate bulk data between the local data fabrics 430, 432 and a global data fabric 470, which enables all compute nodes in the HPC system 400 to access bulk data using a common, global memory address space.

The node and interconnect components of the HPC system of FIG. 4 advantageously remove I/O bottlenecks, minimize the impact of I/O resources contending with compute resources for node-level memory bandwidth access, and manage unintended interference of one computing job with another. This design maximizes utilization of expensive components such as processors, High Bandwidth Memory ("HBM"), and non-volatile memory ("NVM"). In particular, the primary system storage of the local data fabrics leverages NVM devices for performance and power benefits. Performance is improved because each compute node connected to a given local data fabric has direct access to read and (with appropriate permissions) write data in any connected NVM, so the architecture requires "zero copy" of data between the compute nodes. Also, this design removes data driven system jitter introduced by sharing a single fabric for compute and data movement. The ability to provide reproducible run-times of applications is improved, especially when coupled with an interconnect topology that can separate compute traffic from causing unexpected interactions between different computing jobs.

System resilience is achieved by addressing the system in a holistic approach. Software, especially in the system management node 220, may provide comprehensive monitoring and logging of memory, especially HBM. The data acceleration capability that is enabled by the "zero copy" architecture ("ZCA") permits much faster checkpointing and job restarting. In various implementations, a capability application running across the entire system could perform a checkpoint in less than 30 seconds—substantially less if the application minimizes the amount of node level data to be saved. This would enable minimal-time switching between capability and software development jobs at scale. ZCA can also be used to capture a larger amount of node operational data that can be analyzed to understand system reliability. The ZCA capability removes the need to have a global parallel filesystem, such as Lustre, with distributed burst buffer nodes. By contrast, ZCA provides a single, high-performance storage facility.

Energy efficiency of individual components is key, being managed in a hierarchical nature, at the component, node, rack, and system level. The introduction of ZCA and computational steering, described in more detail below, enables real-time analysis and visualization of user applications and the system, which can lead to opportunities for real-time computation steering at the application level, and the system level. For example, continuing to run an application that is not producing useful results is not energy efficient. The workflow optimization approach described herein creates opportunities for new ways to reduce energy usage, while simultaneously achieving more results. With the number of components in the system, along with the operational parameters that can measured at high rates, visualization and machine learning may be deployed in some implementations to optimize the energy usage in the system. An example of this is comparing performance differences between different processor dies across the system (due to variance in processor die manufacture).

Improved Workload Management

In accordance with various implementations of the disclosure, an HPC system may use the improved architecture described above in connection with FIG. 4 to perform computational steering. Computational steering leverages data analytics, machine learning, and visualization, on top of the ZCA capabilities, to provide feedback to an administrator, or steer application workloads to the main computational elements of the system. Computational steering functions can be supported directly within the data nodes if sufficient compute cycles are available, or additional steering nodes (not shown) can be added to augment the computing resources available in the data nodes.

Figure 5:
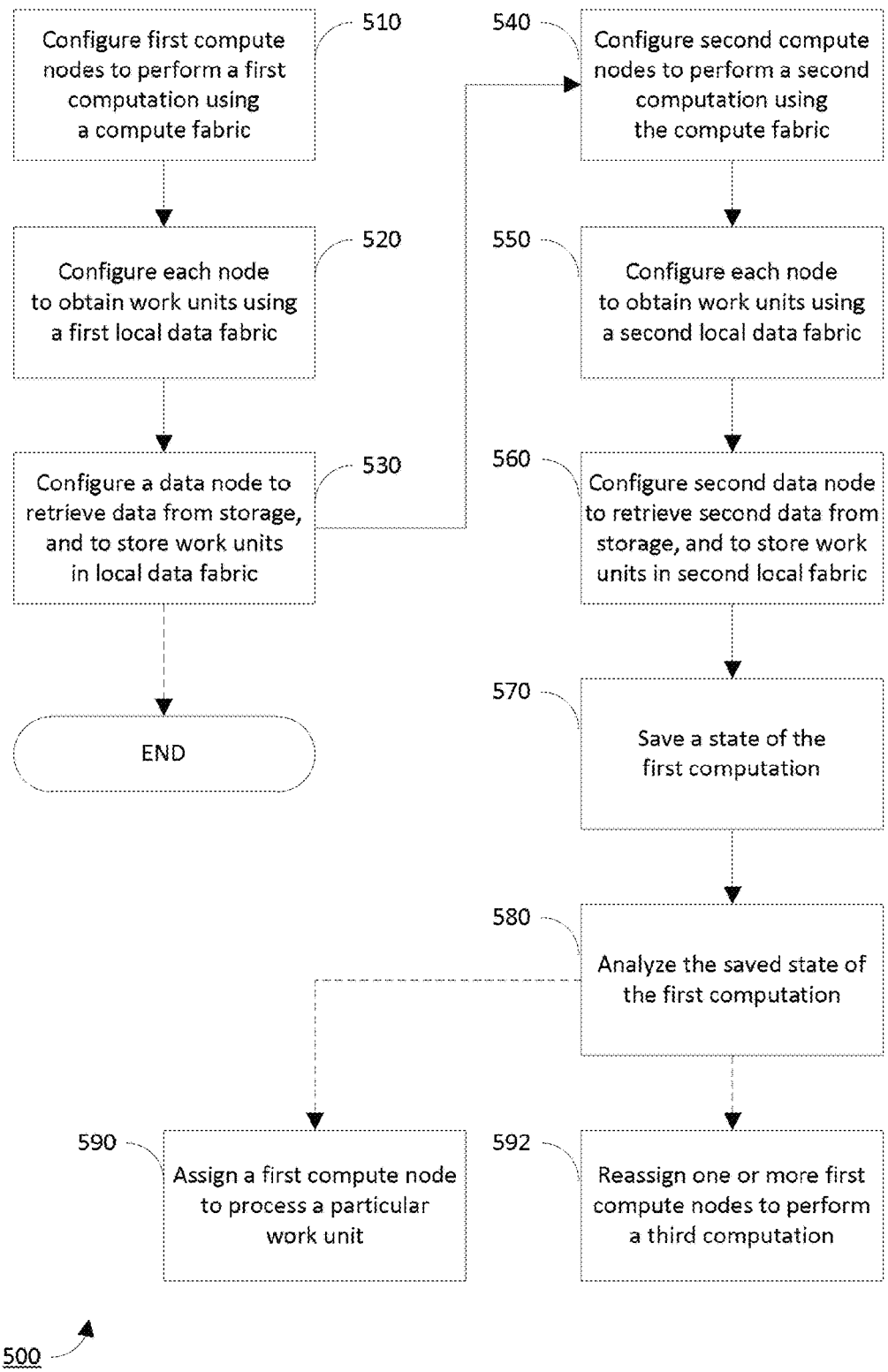
FIG. 5 shows a flowchart for a method of performing a computation that has instructions and data, in accordance with the HPC system of FIG. 4.

FIG. 5 shows a flowchart for a method 500 of performing a computation that has instructions and data in accordance with the implementation of FIG. 4. The basic method has two processes 510, 520 that configure the various compute nodes in groups 410, 412 to use the compute fabric 420 and the local data fabrics 430, 432, and one process 530 that configures the data nodes 450, 452 to populate the memory 440, 442 with work units.

Thus, a first process 510 configures a plurality of compute nodes (e.g. group 410) to cooperatively perform the computation using the compute fabric 420. This cooperation is achieved through mutual communication between the compute nodes in the group 410, according to the algorithmic instructions of the computation. Next, a second process 520 configures each of the compute nodes in the group 410 to obtain computational work units using the local data fabric 430. In this way, work units do not travel across the compute fabric, and algorithmic instructions do not travel across the local data fabric. Finally, a third process 530 configures a data node 450 to retrieve the computational data from an external bulk data storage, and to store work units in NVM 440. The computational data may be divided into work units by the data node 450, or they already may be stored as work units in the external bulk data storage.

The method may end at this point, and the computation is performed. The computation may pertain, for example, to weather forecasting, aerodynamic modeling, cryptography or code breaking, simulation of nuclear weapons testing, molecular dynamics, 'big data' analytics, or any other similar scientific, technical, engineering, or mathematical topic. However, in accordance with an advantageous implementation of the disclosure, a second computation is performed that pertains to optimizing performance of the first computation by the HPC system 400.

In accordance with this implementation, the method further includes, in connection with the second computation, performing processes 540, 550, 560 that are directly analogous to processes 510, 520, 530 but use a second group 412 of compute nodes and, optionally, a second data node 452. Thus, the HPC system 400 may perform both computations concurrently, on separate groups 410, 412 of compute nodes, using entirely separate computing resources.

The method then continues with a process 570, in which the second group of compute nodes saves an intermediate state (i.e., a "checkpoint") of the first computation. Advantageously, the first group of compute nodes need not interrupt performance of the first computation for an extended period, because the second group of compute nodes performs the checkpointing process using a computation that is already loaded and ready to execute. In particular, nodes in the first group may not need to perform a context switch. That is, it may not be necessary for such nodes to (1) save the current state of the computation, (2) load a new instruction stream and data for checkpointing, (3) perform the checkpoint process, (4) reload the saved computational context, and (5) resume the computation. Moreover, if the second group of compute nodes resides on the same local data fabric as the first group, it may be able to access the computational state directly, using the "zero copy" architecture of the data fabric.

In process 580, the second group of nodes analyzes the saved state of the computation—while the first group of nodes continues to perform it. The analysis may be performed using any appropriate analytical framework or technique that is relevant to the technical domain of the computation. With respect to meta-analysis of the computation's performance characteristics in the HPC system 400 itself, machine learning may be employed to optimize energy usage, resilience, or workload distribution between the compute nodes of the first group. Moreover, the analysis may be presented using a visualization, for example to SMN 220 or customer computer 230, for manual analysis.

As a result of performing this analysis, the method may, in process 590, assign (whether automatically or manually) a compute node in the first group to process a particular work unit, using techniques known in the art. Doing so advantageously prevents the compute node from sitting idle. Alternately, the method may, in process 592, reassign (whether automatically or manually) one or more of the compute nodes in the first group to perform an entirely different, third computation, via the management processes described above. Thus, the analysis may determine an optimal number of compute nodes required by jobs concurrently executing in the HPC system 400, even on different partitions, and dynamically rebalance the number of nodes assigned to each job in process 592. Alternately, the method may include performing, on the basis of the results of the analysis, any other processes known in the art to optimize the operation of the HPC system 400.

Various implementations of the disclosure may be implemented at least in part in any conventional computer programming language. For example, some implementations may be implemented in a procedural programming language (e.g., "C"), or in an object oriented programming language (e.g., "C++"). Other implementations of the disclosure may be implemented as a pre-configured, stand-along hardware element and/or as preprogrammed hardware elements (e.g., application specific integrated circuits, FPGAs, and digital signal processors), or other related components.

In an alternative implementation, the disclosed apparatus and methods may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some implementations may be implemented in a software-as-a-service model ("SAAS") or cloud computing model. Of course, some implementations of the disclosure may be implemented as a combination of both software (e.g., a computer program product) and hardware. Still other implementations of the disclosure are implemented as entirely hardware, or entirely software.

Although the above discussion discloses various exemplary implementations of the disclosure, it should be apparent that those skilled in the art can make various modifications that will achieve some of the advantages of the disclosure without departing from the true scope of the disclosure.

What is claimed is:

1. A system for performing a computation that has instructions and data, the data being divisible into computational work units, the system comprising:
    a compute fabric;
    a plurality of compute nodes to cooperatively perform the computation by mutual communication between the compute nodes, according to the instructions, using the compute fabric;
    a local data fabric simultaneously coupled to each compute node;
    coupled to the local data fabric, a memory for storing computational work units, each of the plurality of compute nodes to obtain computational work units using the local data fabric;
    coupled to the local data fabric, a data node to retrieve the data from an external bulk data storage, and to store the computational work units in the memory; and
    a second plurality of compute nodes to cooperatively perform a second computation that has instructions and data by mutual communication between the compute nodes of the second plurality, according to the instructions of the second computation, using the compute fabric,
    wherein the second plurality of compute nodes saves a state of the first computation.

2. The system according to claim 1, the data of the second computation being divisible into computational work units, the system further comprising: a second local data fabric simultaneously coupled to each compute node in the second plurality; coupled to the second local data fabric, a second memory for storing computational work units of the second computation, each of the second plurality of compute nodes to obtain computational work units using the second local data fabric; and coupled to the second local data fabric and the first data node, a second data node to retrieve the data of the second computation from the external bulk data storage, and to store computational work units of the second computation in the second memory.

3. The system according to claim 1, wherein the second plurality of compute nodes further analyzes the saved state, and on the basis of the analysis, either: assigns a compute node in the first plurality of compute nodes to process a particular computational work unit of the first computation; or reassigns one or more of the compute nodes in the first plurality of compute nodes to perform a third computation.

4. A method of performing a computation that has instructions and data, the data being divisible into computational work units, the method comprising:
configuring a plurality of compute nodes to cooperatively perform the computation by mutual communication between the compute nodes, according to the instructions, using a compute fabric;
configuring each of the plurality of compute nodes to obtain computational work units using a local data fabric simultaneously coupled to each compute node;
configuring a data node, coupled to the local data fabric, to retrieve the data from an external bulk data storage, and to store the computational work units in a memory coupled to the local data fabric; and
configuring a second plurality of compute nodes to cooperatively perform a second computation that has instructions and data by mutual communication between the compute nodes of the second plurality, according to the instructions of the second computation, using the compute fabric,
wherein the second plurality of compute nodes saves a state of the first computation.

5. The method according to claim 4, the data of the second computation being divisible into computational work units, the method further comprising: configuring each of the second plurality of compute nodes to obtain computational work units of the second computation using a second local data fabric simultaneously coupled to each compute node in the second plurality; and configuring a second data node, coupled to the second local data fabric and the first data node, to retrieve the data of the second computation from the external bulk data storage, and to store the computational work units of the second computation in a second memory coupled to the second local data fabric.

6. The method according to claim 4, wherein the second plurality of compute nodes further analyzes the saved state, and on the basis of the analysis, either: assigns a compute node in the first plurality of compute nodes to process a particular computational work unit of the first computation; or reassigns one or more of the compute nodes in the first plurality of compute nodes to perform a third computation.

7. A tangible computer-readable medium in which is non-transitorily fixed a series of computer instructions that, when executed by a plurality of compute nodes, produces a method of performing a computation that has data, the data being divisible into computational work units, the method comprising:
configuring a plurality of compute nodes to cooperatively perform the computation by mutual communication between the compute nodes, according to the instructions, using a compute fabric;
configuring each of the plurality of compute nodes to obtain computational work units using a local data fabric simultaneously coupled to each compute node;
configuring a data node, coupled to the local data fabric, to retrieve the data from an external bulk data storage, and to store the computational work units in a memory coupled to the local data fabric;
configuring a second plurality of compute nodes to cooperatively perform a second computation that has instructions and data by mutual communication between the compute nodes of the second plurality, according to the instructions of the second computation, using the compute fabric; and
saving, by the second plurality of compute nodes, a state of the first computation.

8. The medium according to claim 7, the data of the second computation being divisible into computational work units, the method further comprising:
configuring each of the second plurality of compute nodes to obtain computational work units of the second computation using a second local data fabric simultaneously coupled to each compute node in the second plurality; and
configuring a second data node, coupled to the second local data fabric and the first data node, to retrieve the data of the second computation from the external bulk data storage, and to store the computational work units of the second computation in a second memory coupled to the second local data fabric.

9. The medium according to claim 7, the method further comprising the second plurality of compute nodes analyzing the saved state, and on the basis of the analysis, either: assigning a compute node in the first plurality of compute nodes to process a particular computational work unit of the first computation; or reassigning one or more of the compute nodes in the first plurality of compute nodes to perform a third computation.

* * * * *